US009100464B2

(12) United States Patent
Dasher et al.

(10) Patent No.: US 9,100,464 B2
(45) Date of Patent: Aug. 4, 2015

(54) REGULATING CONTENT STREAMS FROM A WEIGHTED FAIR QUEUING SCHEDULER USING WEIGHTS DEFINED FOR USER EQUIPMENT NODES

(75) Inventors: Charles Dasher, Lawrenceville, GA (US); Chris Phillips, Hartwell, GA (US); Jennifer Reynolds, Duluth, GA (US); Bob Forsman, Sugar Hill, GA (US)

(73) Assignee: ERICSSON TELEVISION INC., Duluth, GA (US)

( * ) Notice: Subject to any disclaimer, the term of this patent is extended or adjusted under 35 U.S.C. 154(b) by 289 days.

(21) Appl. No.: 13/597,333

(22) Filed: Aug. 29, 2012

(65) Prior Publication Data

US 2014/0068076 A1 Mar. 6, 2014

(51) Int. Cl.
*G06F 15/173* (2006.01)
*H04L 29/06* (2006.01)

(52) U.S. Cl.
CPC .......... *H04L 65/602* (2013.01); *H04L 65/4076* (2013.01); *H04L 65/4084* (2013.01)

(58) Field of Classification Search
USPC .................. 709/223, 225, 226, 227, 229, 250
See application file for complete search history.

(56) References Cited

U.S. PATENT DOCUMENTS

| 6,006,264 | A | 12/1999 | Colby et al. |
| 6,501,762 | B1 | 12/2002 | Pillar et al. |
| 8,325,764 | B2 * | 12/2012 | Frink et al. ..................... 370/474 |
| 8,665,724 | B2 * | 3/2014 | Stanwood et al. ............ 370/235 |
| 2003/0103497 | A1 | 6/2003 | Speight |
| 2005/0058068 | A1 | 3/2005 | Ben Ali et al. |
| 2006/0222008 | A1 * | 10/2006 | Aaron et al. .................. 370/468 |
| 2006/0268871 | A1 | 11/2006 | Van Zijst |
| 2007/0041364 | A1 | 2/2007 | Kakadia |
| 2008/0155087 | A1 | 6/2008 | Blouin et al. |
| 2010/0302942 | A1 * | 12/2010 | Shankar et al. ............... 370/230 |
| 2012/0014337 | A1 | 1/2012 | Speight |
| 2014/0020037 | A1 * | 1/2014 | Hybertson ..................... 725/109 |

OTHER PUBLICATIONS

Maiya, Harish: "Analysis of Cellular Data Communication for Neighborhood Area Network for Smart Grid". Spring 2011.

* cited by examiner

*Primary Examiner* — Viet Vu (57) ABSTRACT

Apparatuses and methods control communication of content streams through a content distribution network. A data repository is accessed to retrieve information which identifies a group of user equipment nodes that are registered with one of a plurality of subscriber accounts and which further identifies weight values that are associated with the group of the user equipment nodes. Communication bit rates that are provided by a weighted fair queuing scheduler node to individual ones of a group of the content streams within bandwidth allocated to a virtual pipe for carrying the group of the content streams through the content distribution network to the group of the user equipment nodes, are regulated responsive to the weight values associated with the group of the user equipment nodes. Weighted fair queuing scheduling can thereby be provided at a virtual pipe level and, furthermore, at a user equipment node level.

14 Claims, 7 Drawing Sheets

REGULATING CONTENT STREAMS FROM A WEIGHTED FAIR QUEUING SCHEDULER USING WEIGHTS DEFINED FOR USER EQUIPMENT NODES

TECHNICAL FIELD

The present disclosure relates to communication networks and, more particularly, to content distribution systems that provide adaptive rate content streams to user equipment nodes.

BACKGROUND

Content providers have long struggled with how to provide media to their customers at a high availability and high performance in view of bandwidth limitations in content distribution networks. A Content Distribution Network (CDN) can be a large distributed system of servers deployed in multiple data centers connected to the Internet or other public/private communication network. One function of a CDN is to serve media content (e.g., video/audio/etc.) to user equipment nodes (UEs). Example UEs that can receive media content are televisions, digital media recorders, desktop computers, and mobile terminals (e.g., smart phones and tablet computers).

The bandwidth requirements for distributing content from content providers to central CDN servers and/or to distributed CDN replication servers have grown tremendously with the proliferation of adaptive streaming content delivery solutions. Adaptive streaming technology is being implemented to handle increasing consumer demands for streaming content from Over The Top (OTT) applications on OTT content servers (e.g., broadcast and on-demand movies/TV/etc.) across a CDN to UEs having widely differing performance and protocols. Example adaptive streaming protocols includes Apple initiated HTTP Live Streaming (HLS) protocol, Microsoft initiated Smooth Streaming over HTTP protocol, Adobe initiated Dynamic Streaming protocol, and MPEG Dynamic Adaptive Streaming over HTTP (MPEG DASH) protocol.

HTTP Adaptive Streaming Servers (HASS) can function to convert a source media content stream into a plurality of content streams having different coding bit rates. A group of multiple bit rate content streams may be transcoded to provide a plurality of groups of multiple bit rate content streams having different distribution container formats that can be required by different streaming protocols used by UEs (e.g., HLS protocol, Smooth Streaming protocol, Dynamic Streaming protocol, MPEG DASH protocol, etc.). Accordingly, a single group of multiple bit rate content streams can result in numerous groups of differently formatted multiple bit rate content streams that need to be distributed and stored at a central CDN server and/or distributed to CDN replication servers. Distributing media content in this manner consumes tremendous CDN resources. Moreover, some types of media, such as video, can consume particularly high bandwidth for each stream.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

Network nodes, such as HTTP Adaptive Streaming Servers (HASS), can use weighted fair network queuing to control bandwidth usage by content streams. However, weighted fair network queuing has been limited to regulating bandwidth utilization by subscribers. No capability was provided for allowing subscribers and/or operators to regulate bandwidth usage by individual user equipment nodes that are associated with a particular one of the subscribers.

It may therefore be an object to address at least some of the above mentioned disadvantages and/or to provide improved control over the communication of content streams through a content distribution network to user equipment nodes. Some embodiments disclosed herein enable an operator to define policies for regulating bandwidth that is provided by a weighted fair queuing scheduler node to subscriber-level virtual pipes through a content delivery network for communication of content streams to the subscribers. Moreover, a subscriber can define policies for regulating the communication bit rates that are provided by the weighted fair queuing scheduler node to individual ones of a group of the content streams within the bandwidth that is allocated to a virtual pipe. Accordingly, content delivery to individual user equipment nodes can be regulated responsive to operator and/or subscriber defined policies.

One embodiment is directed to a method by at least one network node for controlling the communication of content streams through a content distribution network. The method includes accessing a data repository to retrieve information which identifies a group of user equipment nodes that are registered with one of a plurality of subscriber accounts, and which further identifies weight values that are associated with the group of the user equipment nodes. The method further includes regulating communication bit rates that are provided by a weighted fair queuing scheduler node to individual ones of a group of the content streams within bandwidth allocated to a virtual pipe for carrying the group of the content streams through the content distribution network to the group of the user equipment nodes, responsive to the weight values associated with the group of the user equipment nodes.

A potential advantage of this approach is that a subscriber may define individual priority levels to individual user equipment nodes, to cause some user equipment to have higher available data rates than other user equipment, and so that lower priority equipment will be less likely to overly consume bandwidth which is needed by higher priority equipment.

Another embodiment is directed to a bandwidth decision manager node that controls the communication of content streams through a content distribution network to a plurality of user equipment nodes. The bandwidth decision manager includes a processor circuit that is configured to access a data repository to retrieve information which identifies a group of user equipment nodes that are registered with one of a plurality of subscriber accounts and which further identifies weight values that are associated with the group of the user equipment nodes. The processor is further configured to regulate communication bit rates that are provided by a weighted fair queuing scheduler node to individual ones of a group of the content streams within bandwidth allocated to a virtual pipe for carrying the group of the content streams through the content distribution network to the group of the user equipment nodes, responsive to the weight values associated with the group of the user equipment nodes.

Another embodiment is directed to a weighted fair queuing scheduler node that controls the communication of content streams through a content distribution network to a plurality of user equipment nodes. The weighted fair queuing scheduler node includes a plurality of memory queues and a processor circuit. The processor circuit is configured to receive information from a bandwidth decision manager node which identifies associations between a group of the user equipment nodes and weight values. The processor circuit associates each of the weight values with a different one of a group of the memory queues, and receives data segments from the content streams within the group of the content streams, the data segments including a source address and a destination address. The processor circuit saves particular ones of the data segments into particular ones of the memory queues that are selected responsive to the destination addresses of the particular ones of the data segments, and controls rates at which the data segments are retrieved from particular ones of the memory queues and forwarded toward the group of the user equipment nodes, responsive to the weight values that are associated with the particular ones of the memory queues. The processor circuit forwards the retrieved data segments toward the group of the user equipment nodes using the destination addresses of the retrieved data segments.

Other methods and apparatuses according to embodiments of the invention will be or become apparent to one with skill in the art upon review of the following drawings and detailed description. It is intended that all such additional methods and apparatuses be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

The invention will now be described more fully hereinafter with reference to the accompanying drawings, in which embodiments of the invention are shown. This invention may, however, be embodied in many different forms and should not be construed as limited to the embodiments set forth herein.

Some embodiments are directed to a content distribution system in which bandwidth is allocated to virtual pipes which carry groups of content streams through a content distribution network to groups of user equipment nodes associated with subscriber accounts. The bandwidth that is allocated to individual ones of the virtual pipes is regulated by a weighted fair queuing scheduler node responsive to corresponding ones of a plurality of subscriber-level weight values that are associated with different ones of the subscriber accounts. Moreover, the communication bit rates that are provided by a weighted fair queuing scheduler node to individual ones of a group of the content streams within the bandwidth allocated to one of the virtual pipes, are regulated responsive to weight values that are associated with the group of the user equipment nodes to which the content streams are delivered.

Accordingly, the bandwidth of individual ones of the virtual pipes is regulated using the subscriber-level weight values that are associated with different ones of the subscriber accounts. The communication bit rates that are provided to individual ones of a group of the content streams are regulated responsive to the weight values that are associated with individual ones of the user equipment nodes within the group of user equipment nodes. The subscriber-level weight values may be defined by, for example, an operator to provide different bandwidth tiers to different subscribers. In contrast, a subscriber may define the weight values for the user equipment nodes to regulate the relative priority at which different ones of the user equipment nodes are provided a weighted fair share of the bandwidth allocated to the associated virtual pipe.

Thus, for example, an operator can allocate a relative high level of bandwidth to a virtual pipe of a premium tier subscriber. The subscriber can define weight values that provide higher communication bit rates to certain defined ones of the user equipment nodes relative to other defined ones of the user equipment nodes. The user equipment nodes can be any type of electronic device that can receive content streams, and can include, but are not limited to, televisions, digital media recorders, desktop computers, and mobile terminals (e.g., smart phones and tablet computers). The content streams can include, but are not limited to, video streams, audio streams, program applications, and/or other digital data.

Figure 1:
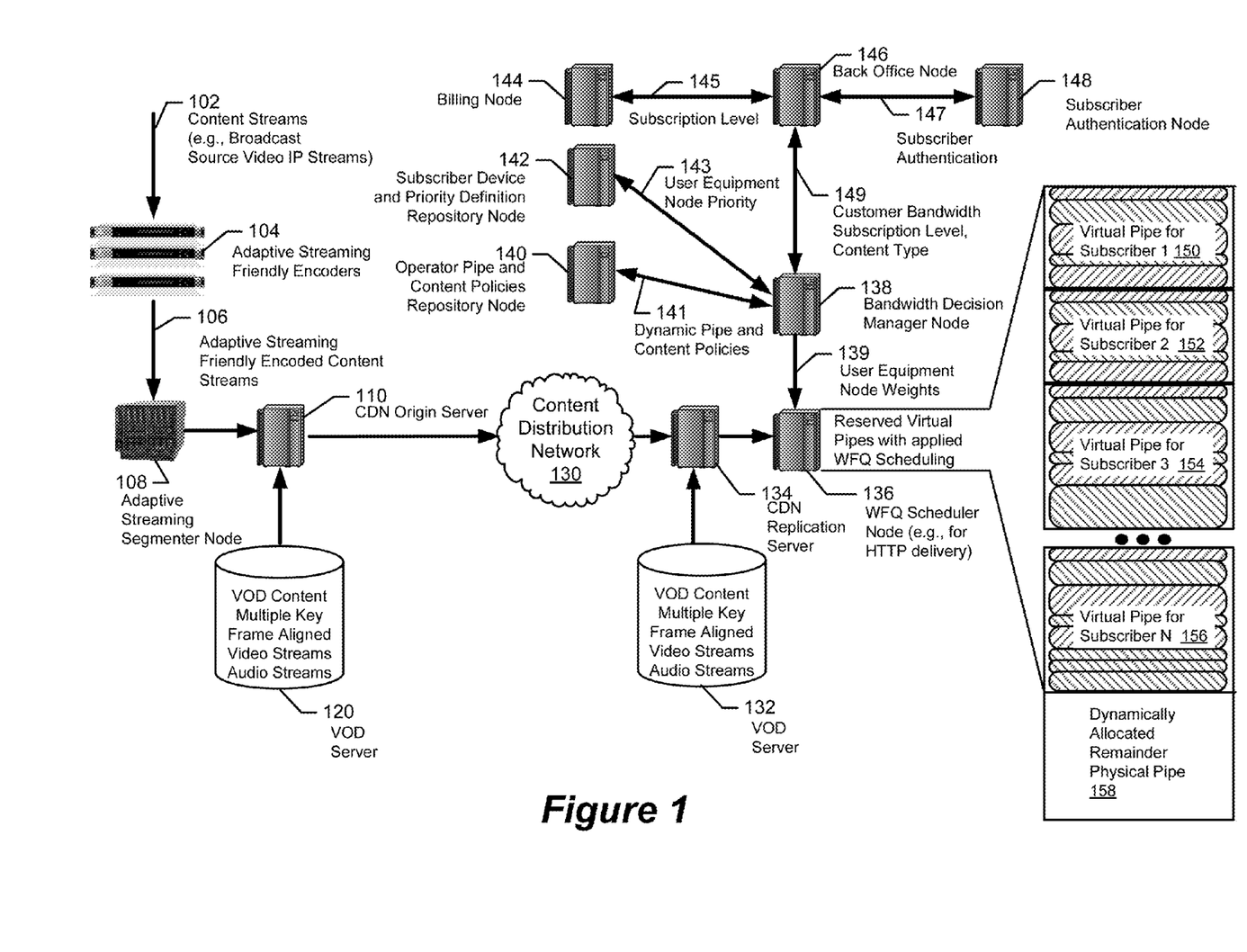
FIG. 1 is a block diagram of a content distribution system that is configured to operate according to some embodiments.

FIG. 1 is a block diagram of a content distribution system that is configured to operate according to some embodiments. The system receives a plurality of broadcast contents streams 102 (e.g., broadcast source video IP streams) at one or more adaptive streaming friendly transcoders 104. The adaptive streaming friendly transcoders 104 output a plurality of content streams 106 (e.g., broadcast adaptive streaming friendly encoded content streams) having different coding bit rates of the same source media content. Thus, for example, a broadcast movie stream 102 can be encoded to provide a plurality of content streams having different coding bit rates (e.g. 4 Mbps, 2 Mbps, 1 Mbps, 500 Kbps, etc.) of the same broadcast movie stream 102 to provide adaptive bit rate streaming capability to a user equipment node. An adaptive streaming segmenter node 108 can segment the streams for distribution by a content distribution network (CDN) origin server 110 through a CDN 130 to a CDN replication server 134.

The content distribution system may alternatively or additionally include a Video on Demand (VOD) server 120 that can output adaptive streaming friendly encoded content streams (e.g., multiple key frame aligned video streams and multiplexed/separate audio streams), which have different coding bit rates of the same source media content, through the CDN origin server 110 for distribution through a CDN 130 to a CDN replication server 134. The CDN replication server 134 can alternatively or additionally receive adaptive streaming friendly encoded content streams from another VOD server 132. The replication server 134 can be located near an edge of the CDN 130, and can store and forward the content streams to a weighted fair queuing (WFQ) scheduler node 136.

The WFQ scheduler node 136 buffers data segments of each of the received content streams, by saving and retrieving the data segments of different content streams in different memory queues of an input buffer. The node 136 uses a scheduling technique that associates scheduling weights (e.g., priorities) to each of the memory queues, and retrieves the data segments from individual ones of the memory queues at rates that are controlled responsive to the associated weights (e.g., priorities). The retrieved data segments of the content streams are thereby statistically multiplexed when forwarded through the content distribution network, e.g., broadband cable network connections to subscriber homes/businesses, for receipt by user equipment nodes of the subscribers.

A bandwidth decision manager node 138 controls the scheduling performed by the WFQ scheduler node 136 using subscriber-level weight values and user-equipment-node-level weight values 139 that it provides to the WFQ scheduler node 136. The bandwidth decision manager node 138 operates in combination with the WFQ scheduler node 136 to regulate the bandwidth allocated to virtual pipes for carrying content streams through the content distribution network to groups of user equipment nodes associated with each of the subscriber accounts. Moreover, the bandwidth decision manager node 138 operates in combination with the WFQ scheduler node 136 to regulate the communication bit rates that are provided by a WFQ scheduler node 136 to individual ones of a group of the content streams within bandwidth allocated to a virtual pipe for carrying the group of the content streams through the content distribution network to the group of the user equipment nodes.

In the example illustration of FIG. 1, the WFQ scheduler node 136 controls the multiplexing of segments of content streams through a physical pipe (content distribution network) to N different subscribers, where N is a natural number, using weighted fair queuing scheduling. The WFQ scheduler node 136 provides a plurality of virtual pipes, one to each subscriber for communication of content streams. The virtual pipes can be constrained to use no more than a dynamically allocated amount of the available bandwidth of the physical pipe. The remaining amount of available bandwidth 158 can be used for other types of subscriber communications (e.g., web page access).

In the example of FIG. 1, the WFQ scheduler node 136 provides a first virtual pipe 150 for the communication of a plurality of content streams to user equipment nodes associated with subscriber 1, a second virtual pipe 152 for the communication of a plurality of content streams to user equipment nodes associated with subscriber 2, a third virtual pipe 154 for the communication of a plurality of content streams to user equipment nodes associated with subscriber 3, and, so on, with an N'th virtual pipe 156 for the communication of a plurality of content streams to user equipment nodes associated with subscriber N.

Figure 2:
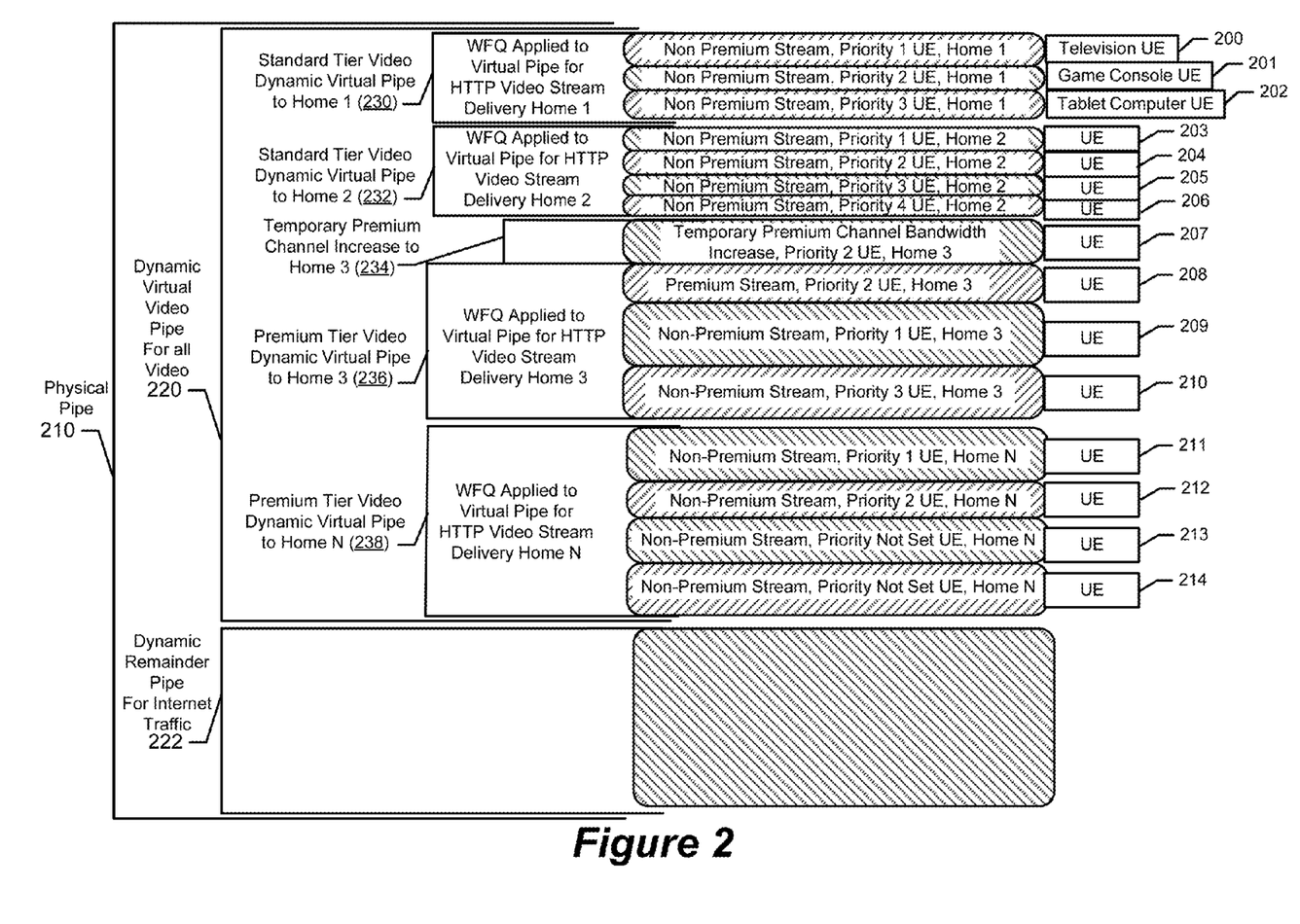
FIG. 2 illustrates example operations and methods by the bandwidth decision manager node and/or the weight fair queuing scheduler node to regulate the communication bit rates of groups of virtual pipes that deliver content to groups of user equipment nodes associated with different subscribers, according to some embodiments.
Figure 3:
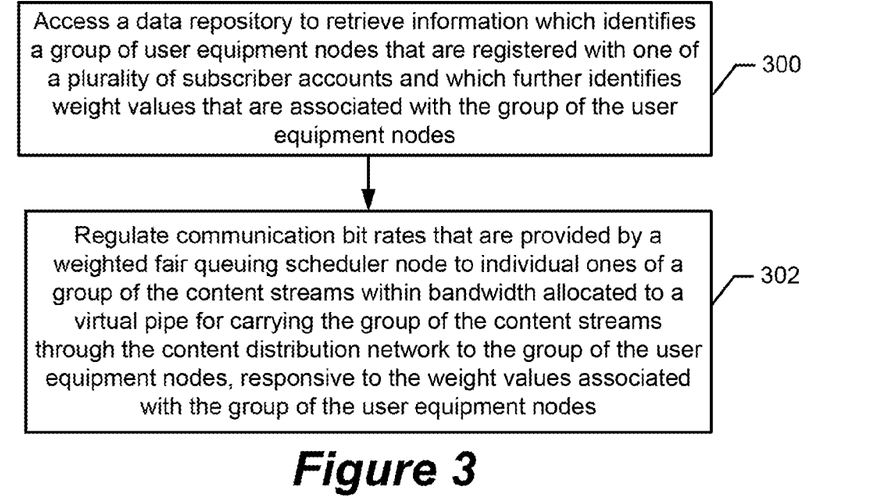
FIGS. 3-10 are flowcharts of operations and methods performed by the bandwidth decision manager node and/or the weighted fair queuing scheduler node of FIG. 1 according to some embodiments.

Referring to the more detailed example of FIG. 2, the WFQ scheduler node 136 can dynamically allocate a communication bandwidth level 220 of the physical pipe 210 (of the content distribution network, such as broadband cable network connections to subscribers' homes/businesses) for use in communicating all video (or other defined content) streams to subscribers' user equipment nodes, and can dynamically provide the remainder communication bandwidth 222 for use by Internet traffic or other types of traffic communications to/from subscribers' user equipment nodes.

The WFQ scheduler node 136 determines subscriber-level weight values which are associated with different ones of N subscriber accounts. The WFQ scheduler node 136 regulates portions of the bandwidth 220 allocated to N different virtual pipes 230-238 that are used for carrying respective groups of the video streams delivery to N different homes associated with the subscriber accounts, responsive to the subscriber-level weight values that are associated with the different ones of the subscriber accounts.

In the example illustration of FIG. 2, the WFQ scheduler node 136 uses the subscriber-level weight value for the subscriber associated with Home 1 to provide WFQ scheduling of standard tier level video delivery to Home 1 though a dynamic virtual pipe 230, uses the subscriber-level weight value for the subscriber associated with Home 2 to provide WFQ scheduling of standard tier level video delivery to Home 2 though a dynamic virtual pipe 232, uses the subscriber-level weight value for the subscriber associated with Home 3 to provide WFQ scheduling of premium tier level video delivery to Home 3 though a dynamic virtual pipe 236, and, so on, uses the subscriber-level weight value for the subscriber associated with Home N to provide WFQ scheduling of premium tier level video delivery to Home N though a dynamic virtual pipe 238.

Moreover, the WFQ scheduler node 136 uses weight values that are associated with individual ones of each subscriber's user equipment nodes to regulate the communication bit rates that are provided to individual content stream being delivered to individual ones of the user equipment nodes.

In the example illustration of FIG. 2, the WFQ scheduler node 136 regulates communication bit rates that are provided to individual ones of three content streams within the bandwidth allocated to the virtual pipe 230 for carrying three separate content streams to three user equipment nodes (e.g., television 200, game console 201, and tablet computer 202) having network addresses located at Home 1, responsive to the weight values (e.g., corresponding to the defined priorities 1, 2, 3) associated with the three user equipment nodes. Similarly, the WFQ scheduler node 136 regulates communication bit rates provided to individual ones of four content streams within the bandwidth allocated to the virtual pipe 232 for carrying four separate content streams to four user equipment nodes 203-206 having network addresses located at Home 2, responsive to the weight values (e.g., corresponding to the defined priorities 1, 2, 3, 4) associated with the three user equipment nodes. The WFQ scheduler node 136 similarly regulates communication bit rates provided to individual ones of the illustrated groups of content streams within the bandwidth allocated to the virtual pipes 236 and 238 for carrying separate content streams to the associated groups of the user equipment nodes (e.g., group 1 of UEs 208-210 and group 2 of UEs 211-214) having network addresses located at respective Home 3 or Home 4, responsive to the weight values associated with the user equipment nodes.

The WFQ scheduler node 136 can regulate the bandwidth allocated to a virtual pipe that is associated with a particular subscriber in response to determining that the virtual pipe has insufficient bandwidth for carrying content from a defined content provider that is, or will be, streaming content to the subscriber. In the example of FIG. 2, the WFQ scheduler node 136 allocated a temporary virtual channel 234 to provide a bandwidth increase for carrying premium content to a UE 207 at subscriber Home 3. Thus, when UE 207 requests streaming content from a defined content provider (e.g., a content provider who has been contractually guaranteed a certain minimum bandwidth to subscribers) and insufficient bandwidth is available within the virtual pipe 236, the WFQ scheduler node 136 can create the virtual channel 234 so that the premium content stream is scheduled for delivery at the subscriber-level instead of competing for scheduling against the other content streams provided to the user equipment nodes 208-210 at Home 3.

Referring again to FIG. 1, the bandwidth decision manager 138 can access a data repository to retrieve information which identifies the subscriber-level weight values that are associated with different ones of the subscriber accounts, and further access the data repository to retrieve information which identifies a group of user equipment nodes that is registered with one of the plurality of subscriber accounts and which further identifies the weight values that are associated with the group of the user equipment nodes.

The data repository may reside in one or more network nodes, such as the illustrated back office node 146, the subscriber device and priority definition repository node 142, and/or the operator pipe and content policies repository node 140. The nodes 146, 142, and 140 may be combined into less nodes or divided into more nodes, and their respective functionality may reside in-part or in-whole in other network nodes.

The back office node 146 can interface with a subscriber authentication node 148 to authenticate a subscriber (e.g., user authentication information 147), and, when the subscriber is properly authenticated, can interface with a billing node 144 to determine the subscription level authorized for the subscriber 145. The bandwidth decision manager node 138 can receive customer bandwidth subscriber level information 149 from the back office node 146, and may receive other information, such as content types that are allowed to be streamed to/from the subscriber.

The bandwidth decision manager node 138 also accesses the subscriber device and priority definition repository node 142 to receive user equipment node-level priority values 143 that a subscriber has assigned to the user equipment nodes of that subscriber. The subscriber may, for example, log-in via the Internet to the subscriber's account, and register user equipment nodes (e.g., by identifying network addresses of the user equipment nodes or other identifiers) and further define priority values for the user equipment nodes. The user equipment nodes may be initially provided equal default priority values, which a subscriber can review and modify for particular ones of the user equipment nodes to establish different priority levels (e.g., 10 different available priority levels) for different ones of the user equipment nodes.

The bandwidth decision manager node 138 can also access the operator pipe and content policies repository node 140 to receive virtual pipe and content policy information 141 and other operator defined policy information that is to be used to control communications with a subscriber. The virtual pipe and content policy information 141 may define, for example, a temporary increased/decreased bandwidth promotion that is being offered-to/mandated-upon a particular subscriber or to a group of subscribers, and/or may define a temporary increased/decreased bandwidth promotion that is being offered-to/inandated-upon streaming content from a particular content provider.

The bandwidth decision manager node 138 can combine the received information to generate the subscriber-level weight values that are used by the WFQ scheduler node 136 to regulate the bandwidth allocated to each of the virtual pipes for carrying groups of the content streams to an associated one of the subscribers. The bandwidth decision manager node 138 can use the priority value information and may further use other received information to generate the user equipment node-level weight values that are used by the WFQ scheduler node 136 to regulate the communication bit rates that are provided to individual ones of a group of the content streams within bandwidth allocated to a virtual pipe for carrying the group of the content streams through the content distribution network to the group of the user equipment nodes.

Although the bandwidth decision manager node 138 and the weighted fair queuing scheduler node 136 have been illustrated in FIG. 1 as separate functional blocks, it is to be understood that their functionality disclosed herein may reside on the same electronic device or may be distributed across a plurality of electronic devices. Moreover, functionality of the bandwidth decision manager node 138 and the weighted fair queuing scheduler node 136 may be combined on one or more electronic devices with the functionality of one or more of the back office node 146, the priority definition repository node 142, and/or the operator pipe and content policies repository node 140.

FIGS. 3-10 are flowcharts of operations and methods that are performed by a bandwidth decision manager node and/or a weighted fair queuing scheduler node according to some embodiments. Communication of content streams through a content distribution network (e.g., CDN 130 of FIG. 1) is controlled (block 300 of FIG. 3) by accessing a data repository (e.g., nodes 140/142 of FIG. 1) to retrieve information which identifies a group of user equipment nodes (e.g., UEs 200-214 of FIG. 2) that are registered with one of a plurality of subscriber accounts and which further identifies weight values that are associated with the group of the user equipment nodes. Communication bit rates that are provided by a weighted fair queuing scheduler node (e.g., WFQ scheduler 136 of FIG. 1) to individual ones of a group of the content streams within bandwidth allocated to a virtual pipe for carrying the group of the content streams through the content distribution network to the group of the user equipment nodes are regulated (block 302 of FIG. 3), responsive to the weight values associated with the group of the user equipment nodes.

Figure 4:
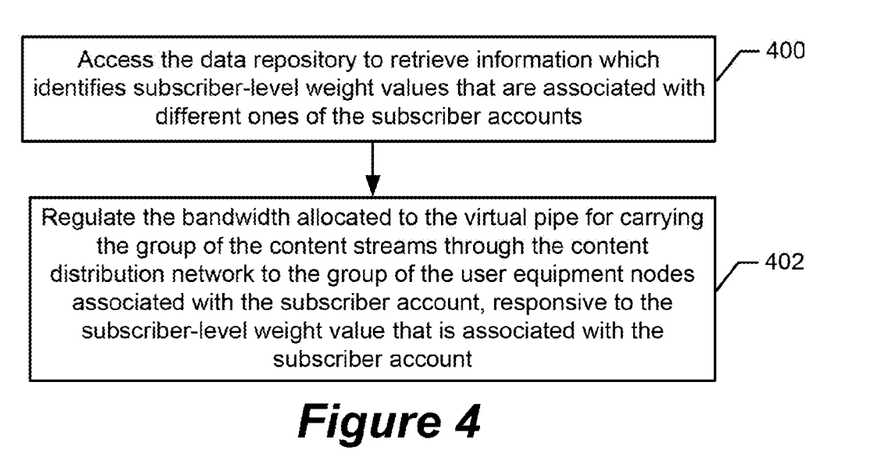

Referring to FIG. 4, the network node (e.g., bandwidth decision manager node 138 of FIG. 1) can access (block 400) the data repository (e.g., nodes 140/142 of FIG. 1) to retrieve information which identifies subscriber-level weight values that are associated with different ones of the subscriber accounts, and regulate (block 402) the bandwidth allocated to the virtual pipe for carrying the group of the content streams through the content distribution network to the group of the user equipment nodes associated with the subscriber account, responsive to the subscriber-level weight value that is associated with the subscriber account.

Figure 5:
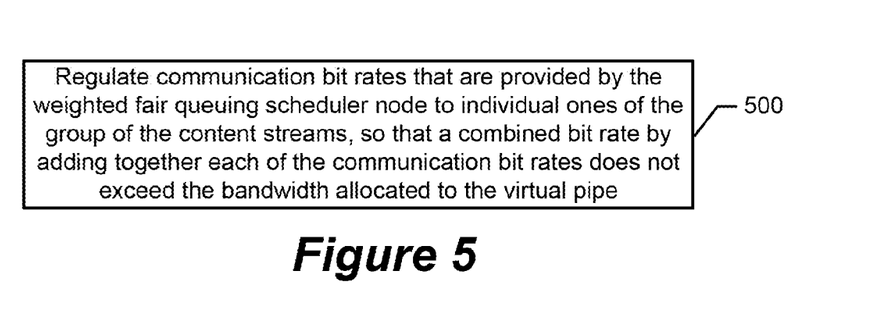

The combined data rates provided for content streams may be limited to the bandwidth allocated to the associated virtual pipe. Referring to FIG. 5, the network node (e.g., bandwidth decision manager node 138 of FIG. 1) can regulate (block 500) the communication bit rates that are provided by the weighted fair queuing scheduler node (e.g., WFQ scheduler 136 of FIG. 1) to individual ones of the group of the content streams, so that a combined bit rate by adding together each of the communication bit rates does not exceed the bandwidth allocated to the virtual pipe.

Figure 6:
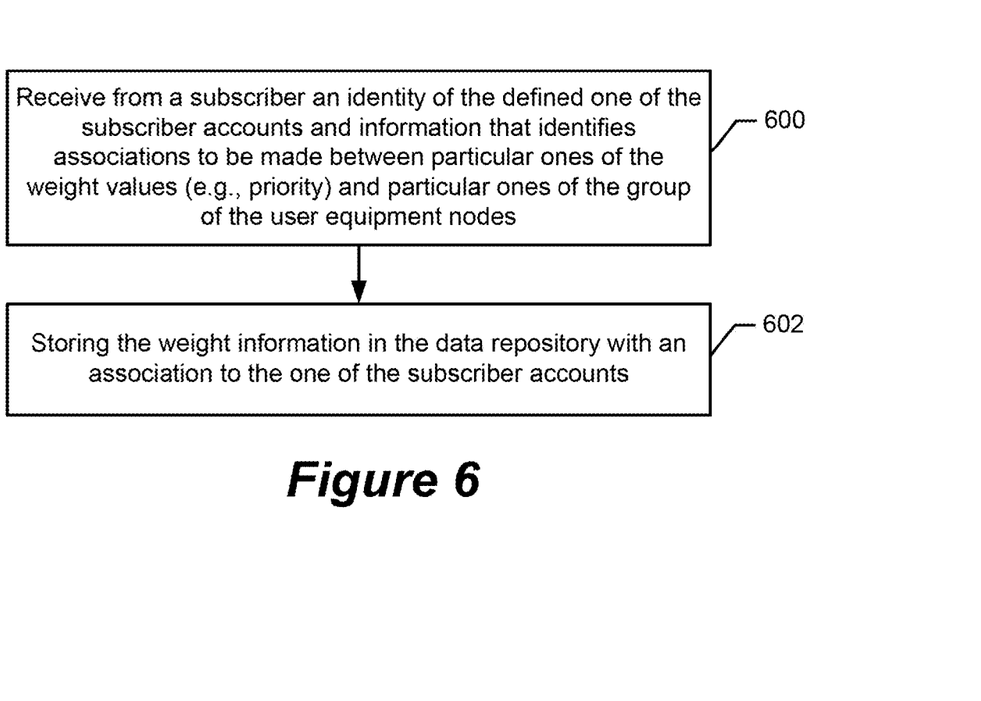

As explained above, a subscriber can define the weight values which are used to control the communication bit rates for particular ones of the user equipment nodes. Referring to FIG. 6, the network node (e.g., the subscriber device and priority definition repository node 142 and/or the bandwidth decision manager node 138 of FIG. 1) can receive (block 600) from a subscriber an identity of the one of the subscriber accounts and weight information that identifies associations to be made between particular ones of the weight values and particular ones of the group of the user equipment nodes. The network node can store (block 602) the weight information in the data repository (e.g., node 142) with an association to the one of the subscriber accounts. The weight values can indicate a relative priority level between individual ones of the group of the user equipment nodes. The subscriber may enter priority level values which are converted to weight values (e.g., the bandwidth decision manager node 138 of FIG. 1), such as by when combining the information with other subscriber dependent or subscriber independent policy information provided by the operator.

Figure 7:
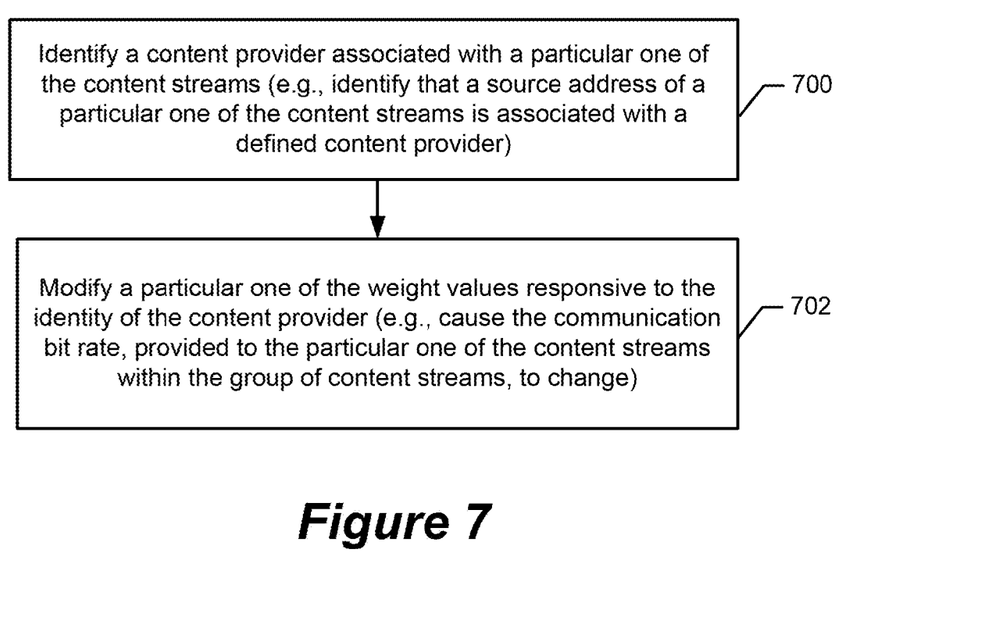

As explained above, the weight values associated with the user equipment nodes can be modified responsive to identifying the content providers who are the source of the content streams. Thus, for example, a premium content provider (e.g., a content provider who has been guaranteed a higher level of bandwidth for streaming to subscribers) can be provided higher data rate content streams to their subscribers relative to the content streams that are being delivered for non-premium content providers. Referring to FIG. 7, the network node can identify (block 700) a content provider associated with a particular one of the content streams, and can modify (block 702) a particular one of the weight values, which is used to regulate the communication bit rate provided by the weighted fair queuing scheduler node to a particular one of the content streams within the group of the content streams, responsive to the identity of the content provider.

The network node may identify (block 700) the content provider associated with the particular one of the content streams by, for example, determining a source address of the particular one of the content streams, and identifying whether the source address is associated with one of a plurality of defined content providers.

The network node may modify (block 702) the particular one of the weight values by, for example, setting the particular one of the weight values to cause the communication bit rate, which is provided by the weighted fair queuing scheduler node to the particular one of the content streams within the group of the content streams, to change.

Figure 8:
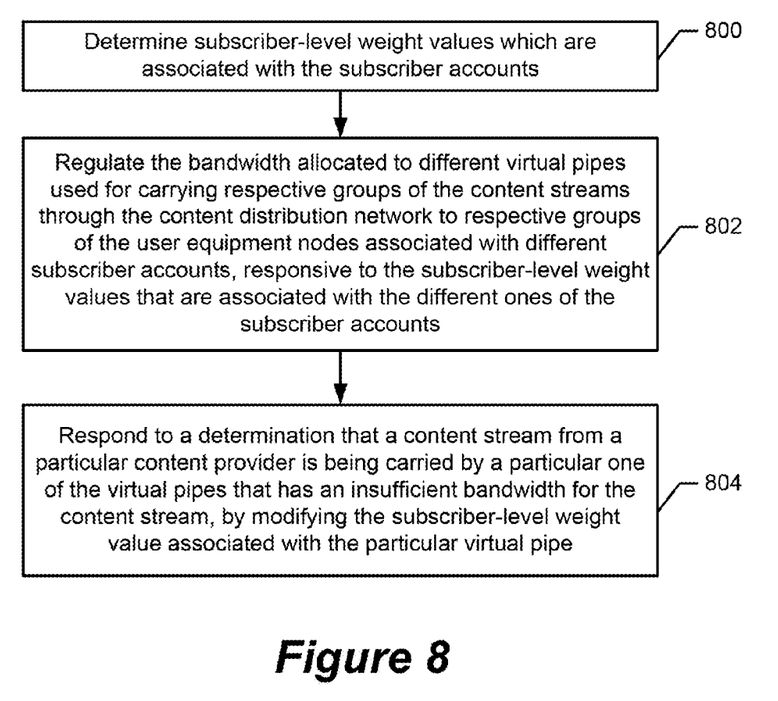

As explained above, the bandwidth allocated to a virtual pipe, for carrying a group of content streams to a group of user equipment nodes associated with a subscriber, can be changed in response to the subscriber receiving content from a defined content provider and a determining that the virtual pipe has insufficient bandwidth. Referring to FIG. 8, the network node can determine (block 800) subscriber-level weight values which are associated with different ones of the subscriber accounts. The network node can regulate (block 802) the bandwidth allocated to different virtual pipes used for carrying respective groups of the content streams through the content distribution network to respective groups of the user equipment nodes associated with different subscriber accounts, responsive to the subscriber-level weight values that are associated with the different ones of the subscriber accounts. The network node can respond (block 804) to a determination that a content stream from a particular content provider is being carried by a particular one of the virtual pipes that has an insufficient bandwidth for the content stream, by modifying the subscriber-level weight value associated with the particular virtual pipe.

Figure 9:
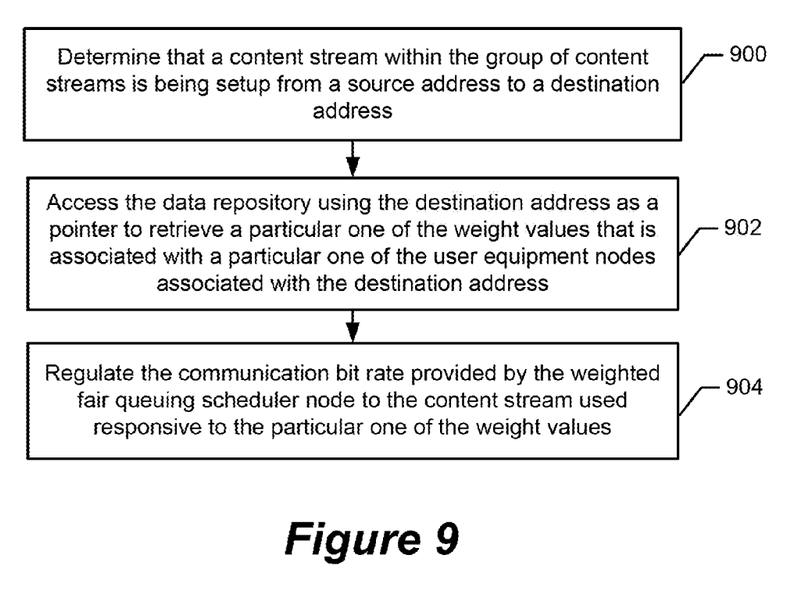

A weight value for a user equipment node can be retrieved from a repository (e.g. the subscriber device and priority definition repository node 142 of FIG. 1) responsive to setup of a content stream to the user equipment node. Referring to FIG. 9, the network node can determine (block 900) that a content stream within the group of content streams is being setup from a source address to a destination address. The network node can access (block 902) the data repository using the destination address as a pointer to retrieve a particular one of the weight values that is associated with a particular one of the user equipment nodes associated with the destination address. The network node can regulate (block 904) the communication bit rate provided by the weighted fair queuing scheduler node to the content stream used responsive to the particular one of the weight values.

Figure 10:
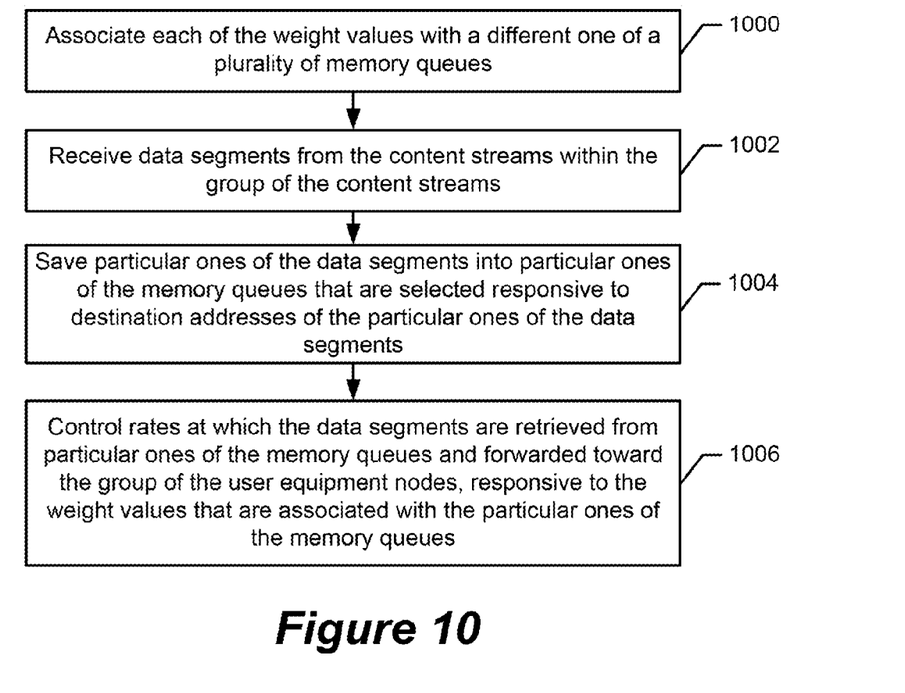

FIG. 10 illustrates various operations and methods may be performed by a network node, such as the WFQ scheduler node 136 of FIG. 1. The network node associates (block 1000) each of the weight values with a different one of a plurality of memory queues. The network node receives (block 1002) data segments from the content streams within the group of the content streams. The network node saves (block 1004) particular ones of the data segments into particular ones of the memory queues that are selected responsive to destination addresses of the particular ones of the data segments. The network node controls (block 1006) rates at which the data segments are retrieved from particular ones of the memory queues and forwarded toward the group of the user equipment nodes, responsive to the weight values that are associated with the particular ones of the memory queues.

Figure 11:
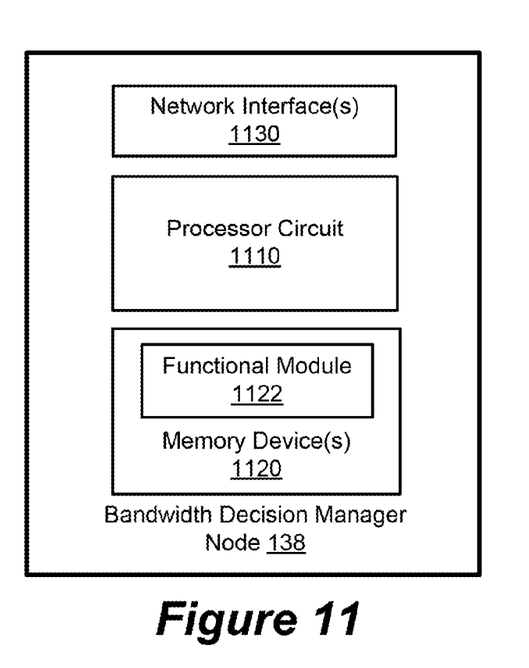
FIG. 11 is a block diagram of an example bandwidth decision manager node that is configured to operate according to some embodiments.

Example Bandwidth Decision Manager Node:

FIG. 11 is a block diagram of a bandwidth decision manager node 138 that is configured according to some embodiments. The bandwidth decision manager node 138 controls the communication of content streams through a content distribution network to a plurality of user equipment nodes. The bandwidth decision manager node 138 may be used in one or more of the network nodes described above with regard to FIGS. 1-10, including, but not limited to, the bandwidth decision manager node 138 of FIG. 1. The node 138 can include one or more network interfaces 1130, processor circuitry 1110, and memory circuitry/devices 1120 that contain functional modules 1122. The processor circuitry 1110 may include one or more data processing circuits, such as a general purpose and/or special purpose processor (e.g., microprocessor and/or digital signal processor). The processor circuitry 1110 is configured to execute computer program instructions from the functional modules 1120 in the memory circuitry/devices 1122, described below as a computer readable medium, to perform some or all of the operations and methods that are described above for one or more of the embodiments, such as the embodiments of FIGS. 1-10.

The processor circuit 1110 is configured to access a data repository to retrieve information which identifies a group of user equipment nodes that is registered with one of a plurality of subscriber accounts and which further identifies weight values that are associated with the group of the user equipment nodes. The processor circuit 1110 is further configured to regulate communication bit rates that are provided by a weighted fair queuing scheduler node to individual ones of a group of the content streams within bandwidth allocated to a virtual pipe for carrying the group of the content streams through the content distribution network to the group of the user equipment nodes, responsive to the weight values associated with the group of the user equipment nodes.

Figure 12:
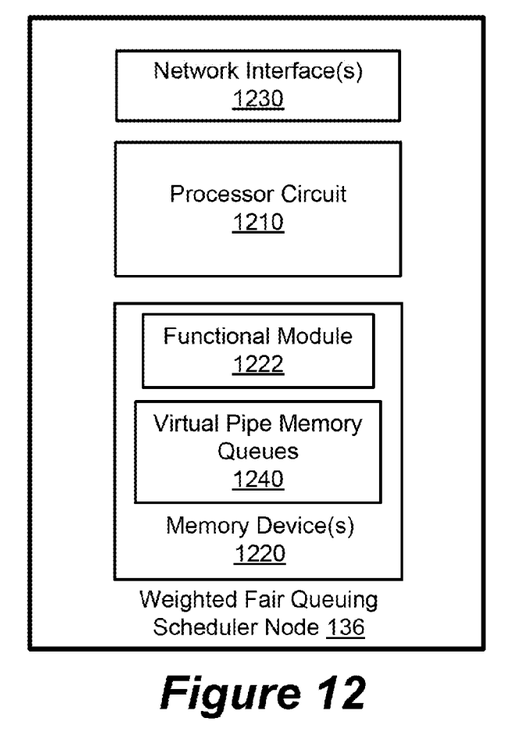
FIG. 12 is a block diagram of an example weighted fair queuing scheduler node that is configured to operate according to some embodiments.

Example Weighted Fair Queuing Scheduler Node:

FIG. 12 is a block diagram of a weighted fair queuing scheduler node 136 that is configured according to some embodiments. The weighted fair queuing scheduler node 136 controls the communication of content streams through a content distribution network to a plurality of user equipment nodes. The weighted fair queuing scheduler node 136 may be used in one or more of the network nodes described above with regard to FIGS. 1-10, including, but not limited to, the WFQ scheduler node 136 of FIG. 1. The node 136 can include one or more network interfaces 1230, processor circuitry 1210, and memory circuitry/devices 1220 that contain functional modules 1222 and virtual pipe memory queues 1240.

The processor circuitry 1210 may include one or more data processing circuits, such as a general purpose and/or special purpose processor (e.g., microprocessor and/or digital signal processor). The processor circuitry 1210 is configured to execute computer program instructions from the functional modules 1222 in the memory circuitry/devices 1220, described below as a computer readable medium, to perform some or all of the operations and methods that are described above for one or more of the embodiments, such as the embodiments of FIGS. 1-10.

The processor circuit 1210 is configured to receive information from a bandwidth decision manager node which identifies associations between a group of the user equipment nodes and weight values, and associates each of the weight values with a different one of a group of the memory queues. The processor circuit 1210 receives data segments from the content streams within the group of the content streams, where the data segments including a source address and a destination address. The processor circuit 1210 saves particular ones of the data segments into particular ones of the memory queues 1240 that are selected responsive to the destination addresses of the particular ones of the data segments. The processor circuit 1210 controls the rates at which it retrieves the data segments from particular ones of the memory queues 1240 for forwarding toward the group of the user equipment nodes, responsive to the weight values that are associated with the particular ones of the memory queues. The processor circuit 1210 forwards the retrieved data segments toward the group of the user equipment nodes through the network interfaces 1130 using the destination addresses of the retrieved data segments.

FURTHER DEFINITIONS AND EMBODIMENTS

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" or "/" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by at least one network node for controlling communication of content streams through a content distribution network, the method comprising:
defining subscriber-level weight values corresponding to a plurality of subscribers being served by an edge replication server node, wherein each subscriber is associated with a corresponding subscriber account and a subscriber-level weight value is operative for regulating bandwidth of a shareable virtual pipe associated with a particular one of the subscribers;
receiving a set of priority values assigned by a subscriber with respect to a group of user equipment (UE) nodes registered with the subscriber;
generating a set of device-level weight values corresponding to the UE nodes based at least in part upon the priority values of the UE nodes and storing the device-level weight values in a data repository;
accessing the data repository to retrieve information which identifies the user equipment nodes registered with the subscriber and which further identifies the device-level weight values that are associated with the group of the user equipment nodes;
regulating, by a weighted fair queuing (WFQ) scheduler node, bandwidth allocation to each virtual pipe associated with a corresponding subscriber, responsive to the subscriber-level weight value defined for the corresponding subscriber; and
regulating, by the WFQ scheduler node, communication bit rates of a group of content streams within a particular virtual pipe of the corresponding subscriber, wherein each content stream is delivered to a particular one of the group of user equipment nodes registered with the corresponding subscriber and regulated responsive to the device-level weight value of the corresponding UE node.

2. The method of claim 1, further comprising:
regulating communication bit rates that are provided by the weighted fair queuing scheduler node to individual ones of the group of the content streams, so that a combined bit rate by adding together each of the communication bit rates does not exceed the bandwidth allocated to the particular virtual pipe.

3. The method of claim 1, wherein the subscriber-level weight values, device-level weight values, or both, may be modified based on at least one of content policy information and operator policy information.

4. The method of claim 3, wherein the device-level weight values indicate a relative priority level between individual ones of the group of the user equipment nodes.

5. The method of claim 3, wherein the content policy information is obtained by identifying a content provider associated with the particular one of the content streams.

6. The method of claim 5, further comprising: determining a source address of the particular one of the content streams and applying a content policy based on the source address.

7. The method of claim 1, further comprising:
responsive to a determination that a content stream from a particular content provider is being carried by a particular one of the virtual pipes that has an insufficient bandwidth for the content stream, modifying the subscriber-level weight value associated with the particular virtual pipe.

8. The method of claim 1, further comprising:
determining that a content stream within the group of content streams is being setup from a source address to a destination address;
accessing the data repository using the destination address as a pointer to retrieve a particular one of the device-level weight values that is associated with a particular one of the user equipment nodes associated with the destination address; and
regulating the communication bit rate provided by the weighted fair queuing scheduler node to the content stream used responsive to the particular one of the device-level weight values.

9. The method of claim 1, further comprising:
associating each of the device-level weight values with a different one of a plurality of memory queues;
receiving data segments from the content streams within the group of the content streams;
saving particular ones of the data segments into particular ones of the memory queues that are selected responsive to destination addresses of the particular ones of the data segments; and
controlling rates at which the data segments are retrieved from particular ones of the memory queues and forwarded toward the group of the user equipment nodes, responsive to the device-level weight values that are associated with the particular ones of the memory queues.

10. A system for controlling communication of content streams through a content distribution network, the system comprising:
a bandwidth decision manager configured to:
define subscriber-level weight values corresponding to a plurality of subscribers being served by an edge replication server node, wherein each subscriber is associated with a corresponding subscriber account and a subscriber-level weight value is operative for regulating bandwidth of a shareable virtual pipe associated with a particular one of the subscribers, and access a set of priority values assigned by a subscriber with respect to a group of user equipment (UE) nodes registered with the subscriber and generate a set of device-level weight values corresponding to the UE nodes based at least in part upon the priority values of the UE nodes and store the device-level weight values in a data repository; and a multi-level weighted fair queuing (WFQ) scheduler, operative responsive to accessing the data repository, configured to:

regulate bandwidth allocation to each virtual pipe associated with a corresponding subscriber, responsive to the subscriber-level weight value defined for the corresponding subscriber, and regulate communication bit rates of a group of content streams within a particular virtual pipe of the corresponding subscriber, wherein each content stream is delivered to a particular one of the group of user equipment nodes registered with the corresponding subscriber and regulated responsive to the device-level weight value of the corresponding UE node.

11. The system of claim 10, wherein the WFQ scheduler is further configured to regulate the communication bit rates of a group of content streams such that a combined bit rate by adding together each of the communication bit rates does not exceed the bandwidth allocated to the particular virtual pipe.

12. The system of claim 10, wherein the subscriber-level weight values, device-level weight values, or both, may be modified by the bandwidth decision manager based on at least one of content policy information and operator policy information.

13. The system of claim 10, wherein the device-level weight values indicate a relative priority level between individual ones of the group of the user equipment nodes.

14. The system of claim 10, wherein the bandwidth decision manager is further configured, responsive to a determination that a content stream from a particular content provider is being carried by a particular one of the virtual pipes that has an insufficient bandwidth for the content stream, to modify the subscriber-level weight value associated with the particular virtual pipe.

* * * * *

UNITED STATES PATENT AND TRADEMARK OFFICE
CERTIFICATE OF CORRECTION

| | | |
|---|---|---|
| PATENT NO. | : 9,100,464 B2 | Page 1 of 1 |
| APPLICATION NO. | : 13/597333 | |
| DATED | : August 4, 2015 | |
| INVENTOR(S) | : Dasher et al. | |

It is certified that error appears in the above-identified patent and that said Letters Patent is hereby corrected as shown below:

In the Specification

In Column 7, Line 55, delete "offered-to/inandated-upon" and insert -- offered-to/mandated-upon --, therefor.

In Column 10, Line 39, delete "modules 1120" and insert -- modules 1122 --, therefor.

In Column 10, Line 40, delete "devices 1122," and insert -- devices 1120, --, therefor.

Signed and Sealed this
Twelfth Day of April, 2016

Michelle K. Lee
*Director of the United States Patent and Trademark Office*